United States Patent [19]

Hunter et al.

[11] 4,055,516

[45] Oct. 25, 1977

[54] POLY(CYANODIFLUOROAMINO ETHERS), THEIR PREPARATION AND UTILIZATION

[75] Inventors: Leon Hunter, Walnut Creek; Walter L. Petty, Moraga, both of Calif.

[73] Assignee: Shell Oil Company, Houston, Tex.

[21] Appl. No.: 127,805

[22] Filed: Mar. 24, 1971

[51] Int. Cl.$^2$ ............................................. C08G 65/32
[52] U.S. Cl. .................................. 260/2 A; 149/19.3; 260/77.5 AP; 260/615 BF
[58] Field of Search .................. 260/2 EP, 2 EC, 2 N, 260/77.5 AP, 2 A, 615 BF

[56] References Cited

U.S. PATENT DOCUMENTS

| | | | |
|---|---|---|---|
| 3,347,801 | 10/1967 | Stogryn | 260/2 |
| 3,433,776 | 3/1969 | Passannante et al. | 260/88.3 |
| 3,441,549 | 4/1969 | Gardiner et al. | 260/88.3 |
| 3,551,225 | 12/1970 | Sayles | 149/19 |

Primary Examiner—Leland A. Sebastian
Attorney, Agent, or Firm—Norris E. Faringer

[57] ABSTRACT

This invention relates to novel polymers containing high energy groups comprising a polyether having the general formula

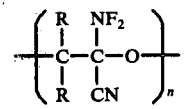

wherein each R is an alkyl or hydrogen and n is an integer from about 10 to 60. The preparation of these novel polyethers and their use as binder materials for high energy solid propellants is also described.

13 Claims, No Drawings

POLY(CYANODIFLUOROAMINO ETHERS), THEIR PREPARATION AND UTILIZATION

The invention herein described was made in the course of or under a contract or subcontract thereunder with the United States Air Force.

BACKGROUND OF THE INVENTION

The preparation of highly unsaturated polyethers having repeating units possessing the general configuration

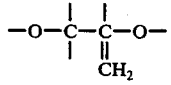

is known wherein a polyepichlorohydrin is dehydrohalogenated. Numerous methods can be utilized to effect the vigorous dehydrohalogenating conditions. These include the use of strong bases, high temperatures or different types of solvents or combinations of two or more of these techniques. The dehydrohalogenation may be effected, for example, by heating the previously prepared polyepihalohydrin with sodium methoxide in methanol, tetrahydrofuran or dimethylsulfoxide under reflux.

In order to effect the dehydrohalogenation and still retain the hydroxyl group or groups or epoxy groups in the terminal units so that they may be present for subsequent reaction, it has been found most helpful to effect the reaction in the presence of dimethyl sulfoxide or tetrahydrofuran as the solvent and metal alkoxides such as sodium methoxide as dehydrohalogenating agents.

It is also known to make valuable high energy adducts from these polyethers by reacting them with $N_2F_4$ under conditions so as to obtain the maximum conversion of double bonds to vicinal bis(difluoroamino) groups. The usual and preferred method comprises adding $N_2F_4$ gas to a reactor containing the functional polyunsaturated polymer in a suitable solvent at elevated temperatures and pressures. The resulting polymer contains high energy groups which comprises a polyether having repeating units of

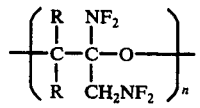

wherein R is hydrogen or a lower alkyl such as methyl or ethyl, preferably hydrogen, and n is an integer between about 10 and 60.

While these difluoroamino-containing polymers do exhibit high energy characteristics that make them especially useful as propellant binders, they do not have the necessary stability required for use in high-temperature binders. In other words, at high temperatures, i.e., above 100° C, they tend to decompose to liberate gaseous by-products. Accordingly these polymers are unsuitable as propellant binders for some applications.

It has now been found that novel, stable, high-energy binders are obtained when these difluoroamino-containing polymers are reacted with suitable basic compounds. The resulting polyethers have repeating units

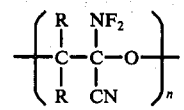

wherein R is hydrogen or a lower alkyl, and are significantly more stable than the difluoramino-containing polyether precursor yet retain high-energy characteristics.

The preparation of suitable polyepihalohydrins, their dehydrohalogenation, and their conversion to polyethers by reaction with $N_2F_4$ is adequately described in detail in related copending patent applications Ser. No. 423,646, filed Dec. 31, 1964, now U.S. Pat. No. 3,976,602, issued Aug. 24, 1976; Ser. No. 660,546, filed July 12, 1967, now U.S. Pat. No. 3,875,189, issued Apr. 1, 1975; and Ser. No. 660,545, filed July 12, 1967, now U.S. Pat. No. 3,914,209, issued Oct. 21, 1975.

SUMMARY OF THE INVENTION

This invention relates to new polyethers containing units having the structure

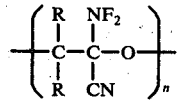

wherein R is hydrogen or a lower alkyl such as methyl, ethyl, etc., preferably hydrogen, and n is an integer of from about 10 to 60.

This invention further relates to a process for preparing these novel polyethers and to their use in combination with curing agents such as isocyanates to form elastomeric high-energy-containing binders for solid propellants.

As noted hereinbefore, the preparation of the precursor compositions form no part of the instant invention. In other words, the preparation of suitable polyepihalohydrins, their dehydrohalogenation and subsequent reaction with $N_2F_4$ to form the difluoroamino-containing polyethers which are used to prepare the instant novel poly(cyanodifluoroamino ethers) are generally known. Accordingly, the disclosure relevant to their preparation found in copending application Ser. No. 423,646, filed Dec. 31, 1964, now U.S. Pat. No. 3,976,602, issued Aug. 24, 1976; Ser. No. 660,546, filed July 12, 1967, now U.S. Pat. No. 3,875,189, issued Apr. 1, 1975; and Ser. No. 660,545, filed July 12, 1967, now U.S. Pat. No. 3,914,209, is herein issued Oct. 21, 1974 incorporated by reference.

DESCRIPTION OF THE PREFERRED EMBODIMENT

Before the present novel poly(cyanodifluoroamino ethers) and their preparation are described, it is believed appropriate to briefly describe the preferred methods for preparing the precursor compounds.

PREPARATION OF POLYEPIHALOHYDRINS

Suitable polyepihalohydrins used to prepare the precursors of the present novel cyano-containing polyethers may be obtained by polymerizing a "halo-epoxy-substituted alkane" in the presence of suitable acidic catalysts. As used here this expression refers to those alkanes having a vicinal epoxy group, i.e., a

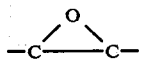

group, attached directly to a halogen bearing carbon atom, such as, for example, epichlorohydrin, epibromohydrin, 1,4-dichloro-2,3-epoxy-butane, 1-chloro-2,3-epoxypentane and the like. Especially preferred are the halo-epoxy-substituted alkanes containing no more than 12 carbon atoms, and preferably from 3 to 8 carbon atoms.

The preferred polyepihalohydrins are the hydroxy terminated polyepichlorohydrins, i.e., those wherein the terminal units contain 1 or more CH groups. These are preferably prepared by polymerizing the epihalohydrins in the presence of a controlled amount of a polyhydroxy-containing material, such as water, polyhydric alcohols or phenols and the like, to form an epihalohydrin polymer. The catalysts used in the polymerization reaction include, among others, the acidic materials, such as hydrofluoric, sulfuric, phosphoric, and hydroiodic acids, and also such "Lewis acids" as tin tetrachloride, and boron trifluoride complexes, especially the ether complex. The concentration of the catalyst employed will vary, depending upon the catalyst, the solvent, the reaction temperature, and the rate of polymerization desired. In general, the catalyst will be employed in amounts varying from about 0.1% to about 5% by weight of the reactants. Larger or smaller amounts of catalyst, such as a $BF_3$-complex, such as $BF_3$-ethyl etherate may be needed to obtain the higher molecular weight polymers and are noted hereinafter.

As noted, the polymerization is conducted in the presence of a polyhydroxy-containing material, such as water, polyhydric alcohols, polyhydric phenols and the like, such as glycerol, glycerol monochlorohydrin, hexanetriol, monomethyl glycerol ether, bis-phenol-A, resorcinol and the like. As to the ratio of halo-epoxy substituted alkane and OH containing material employed in the reaction, there should be at least four moles of the halo-epoxy-substituted alkane and preferably from 10 to 60 moles of the halo-epoxy-substituted alkane per mol of OH-containing material. The exact ratio selected will depend on the molecular weight of the polymer desired, the higher ratios giving the higher molecular weights. Polymers having particularly outstanding properties are those wherein the haloepoxyalkane and the OH-containing material are employed in ratios varying from 10:1 to 60:1.

In mixing the components together, the halo-epoxy-substituted alkane and OH-containing material and catalyst may be combined all at the beginning or one or more of the components may be added separately at one time or throughout the course of the reaction. Early work indicated that it was generally desirable to add the halo-epoxy-substituted alkanes in portions throughout the course of the reaction.

To obtain the higher molecular weight polymers, such as those resulting from the use of ratios of 10:1 or higher, it is sometimes desirable to also add portions of catalyst in the latter part of the reaction. This is due to the fact that after a certain amount of polymer formation, the catalyst sometimes becomes inactive and further addition of catalyst should be employed in order to continue to build up the molecular weight. The amount added in the second stage should be approximately the same as that added at the beginning, e.g., 0.1% to 5% by weight.

The preferred method for preparing polyepihalohydrins is to conduct the entire polymerization using a single addition of the catalyst, such as $BF_3$ etherate, at the beginning. This method not only results in preferred operational benefits of smoother and better control over the reaction, but also produces a higher molecular weight polymer having a narrower and more consistent molecular weight distribution.

Another preferred modified process for producing polyepihalohydrins, which is especially suitable for large scale production comprises pre-reacting a suitable catalyst ($BF_3$ etherate) and a suitable initiator (glycerol) in large quantities. A portion of this preferred catalyst-initiator complex is used to polymerize subsequent epihalohydrin runs. This procedure produces better uniformity of polymerization from batch to batch.

The preparation of a preferred polyepichlorohydrin by the above-described process using glycerol as a trifunctional initiator is described below:

POLYEPICHLOROHYDRIN A 2.2 Parts of $BF_3$-ethyletherate was added to 22.5 parts of glycerol and the mixture heated to 42° C. 1000 Parts of epichlorohydrin dissolved in 1000 parts of methylene chloride was then added slowly to the stirred mixture. Supplemental additions of catalyst (1.1 and 0.7 parts, respectively) were made after 50% and 80% of the epichlorohydrin had been added. The addition of epichlorohydrin took a total of about three hours and the mixture was stirred for an additional 18 hours at 45° C. Removal of catalyst with water and distillation of solvent left a viscous liquid polymer having approximately the following idealized structure where $m + n + p$ is equal to 17:

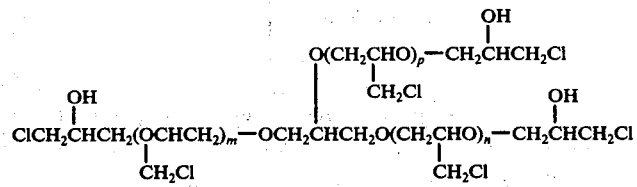

It will be appreciated that the above formula is an "idealized" structure since the determined hydroxyl functionally is generally 2.0 - 2.5.

The preparation of other suitable polyepichlorohydrins is described in copending application Ser. No. 423,646 and related applications noted hereinbefore.

DEHYDROHALOGENATION OF POLYEPIHALOHYDRINS

The above-described polyepihalohydrins are dehydrogenated with conventional dehydrohalogenating agents under vigorous conditions. During this reaction, HCl is removed to form the units

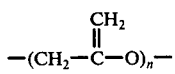

Numerous methods can be utilized to effect the vigorous dehydrohalogenating conditions. These include use of strong bases, high temperatures or different types of solvents or combinations of two or more of these techniques. The dehydrohalogenation may be effected, for example, by heating the polyepihalohydrin with sodium methoxide in methanol under reflux, by heating the polyepihalohydrin with sodium ethoxide in ethanol under reflux, by treating with potassium tert-butoxide in tertiary butanol, by treating the polyepihalohydrin with potassium tert-butoxide in benzene or toluene at or near room temperature.

In order to effect the dehydrohalogenation and still retain hydroxyl group or groups or epoxy groups in the terminal units so that they may be present for subsequent reaction, it has been found most helpful to effect the reaction in the presence of dimethyl sulfoxide or tetrahydrofuran as solvent and dehydrohalogenating agents, such as metal alkoxides as sodium methoxide, potassium tert-butoxide and the like.

Another technique to preserve hydroxyl functionality in the end groups during dehydrochlorination is to convert these terminal units of the polyepichlorohydrin to dioxolane groups and then after the dehydrochlorination and addition reactions hydrolyze the dioxolane groups.

The amount of the dehydrohalogenating agent used may vary over a considerable range, depending on the completeness of dehydrohalogenation desired. The polyepihalohydrin should be reacted with an amount of the agent material which is at least equivalent to the hydrogen halide content of that polyepihalohydrin if complete dehydrohalogenation is desired. Excess agent is usually desired. Less than the equivalent amount of the agent material may be used if all of the halogen atoms are not to be eliminated or displaced.

The amount of the dimethyl sulfoxide solvent to be utilized may vary over a wide range and depends on the viscosity of the reaction mixture. Preferred amounts vary from about two times to about ten times the weight of the polyepihalohydrin to be treated.

In most cases, the dehydrohalogenation reaction may be accomplished at temperatures which preferably range from about 0° C to 150° C and still more preferably 20° C to 80° C.

At the end of the reaction period, the reaction mixture containing polymer, inorganic salt, and solvent is then preferably quenched with water, washed, dried and freed of solvent under vacuum.

The unsaturated polyethers of the invention will be viscous liquids to waxy solids having a high degree of unsaturation and preferably at least one OH group in the terminal units. The polymer preferably has an unsaturation of at least 1.2 equivalents per 100g. The unsaturated polyethers are soluble in many organic solvents, such as halogenated solvents, ketones, esters and aromatic hydrocarbons, and are compatible with many synthetic oils and resins.

The preparation of a suitable hydroxy-substituted polyunsaturated polyether obtained by dehydrochlorinating Polyepichlorohydrin A above is described below:

100 Parts of polyepichlorohydrin A was combined with 700 parts of dimethyl sulfoxide, and 100 parts of sodium methoxide was added to the stirred mixture during 1 hour while maintaining the reaction temperature at 25° C with a cooling bath. The mixture was stirred in a closed reactor for an additional 22 hours. The resulting product made up of a mixture of polymer, inorganic salt and dimethyl sulfoxide was quenched in a large volume of water. The polymer was then taken up in methylene chloride, washed with water, dried and precipitated by pouring into methanol. The powdered product was filtered, rinsed and stripped of solvent. There resulted 33 parts of a fine white powdered polymer having repeating units of

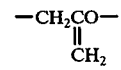

Analysis: C, 62.3%; 7.6%; unsaturation by hydrogenation, 1.46 eq/100g; molecular weight, 2400; hydroxyl, 0.11 eq/100g. The polymer was soluble in methylene chloride, methyl acetate and warm acetone.

PREPARATION OF DIFLUOROAMINO POLYETHERS

In general, the difluoroamino-containing polyethers which are the precursors of the present novel poly(cyanodifluoroamino ethers) are simply prepared by reacting suitable dehydrohalogenated polyepihalohydrins with $N_2F_4$ so as to obtain the maximum conversion of double bonds to vicinal bis(difluoroamino) groups. The usual and preferred method comprises adding $N_2F_4$ gas to a reactor containing the functional polyunsaturated polymer (e.g., DEPECH) in a suitable solvent at elevated temperatures.

Another suitable method comprises injecting the functional polyunsaturated polymer into a reactor which is already under $N_2F_4$ pressure, say 500 psi. In general, the reactor's inner surfaces are constructed of either glass or steel, although other materials may be employed if desired. Using this method, the polymer feed may be introduced beneath a stirred solvent-$N_2F_4$ layer (feed injection).

The temperatures employed normally range from about 40° C to about 120° C with temperatures lower and higher sometimes used. The preferred temperature range is from about 60° C to about 100° C.

In general, pressures above 100 psi are required with pressures of 500 psi and above generally being preferred in order to increase reaction rates.

Reaction times may vary from about an hour to about 20 hours or more depending on reaction temperature and pressure. The reaction is essentially complete after 2 or 3 hours when carried out at 80° C and 500 psig in acetone solvent.

Suitable solvents or diluents include, among others, carbonyl compounds such as ketones, as, for example, acetone and methyl ethyl ketone; esters, as, for example, methyl acetate; ethyl acetate and diethyl oxalate; ethers, as, for example, diethyl ether and tetrahydrofuran; aromatic hydrocarbons, as, for example, benzene and toluene; and halogenated solvents, as, for example, methylene chloride and ethylene chloride and mixtures of these various type solvents. In general, the selection of a particular solvent is based upon a number of factors such as the solubility of $N_2F_4$, the ease of removal of the solvent from the product, etc. The major factor is the ability of the solvent to yield a high quality product. Acetone has been found to be an especially good solvent for the reaction of $N_2F_4$ with this unsaturated polymer, and, under the proper conditions, little degradation or side-reactions occur. The dilution ratio, i.e., the ratio of the unsaturated polymer to solvent, may range from about 1:1 to about 1:40 with from about 1:5 to about 1:20 being generally preferred.

PREPARATION OF POLY(CYANODIFLUOROAMINOETHERS)

The instant novel poly(cyanodifluoroaminoethers) are simply prepared by reacting a polyether having repeating units of

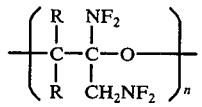

wherein R is hydrogen or lower alkyl (methyl or ethyl) and n is an integer of from 10 to 60 in the presence of a suitable organic base.

Suitable organic bases have a $K_b$ less than about $1 \times 10^{-3}$ and preferably from about $1.0 \times 10^{-4}$ to $1.0 \times 10^{-9}$. Suitable organic bases include, among others, pyridine, aniline, trimethylamine, triethylamine, tripropylamine, anhydrous ammonia and piperidine.

In general, the organic base is used in stoichiometric quantities or with a slight excess of base. Up to about a 20% excess of base is preferred, although in some instances up to 100% excess or higher may be employed.

The reaction is exothermic, therefore cooling is generally applied to maintain ambient temperatures. The reaction may be performed at temperatures from about $-50°$ C to 75° C, with about 10° C to 30° C being preferred.

The reaction may be performed at atmospheric, substmospheric or superatmospheric pressures.

The time required to convert the —$CH_2NF_2$ groups to —CN groups may range from a few minutes to several hours depending upon the reaction parameters, e.g., pressure, % excess base, $K_b$ of base, temperature, etc.

The process may be batch, semi-continuous or continuous.

Very suitable solid propellant binders are obtained when these novel poly(cyanodifluoroamino ethers) are reacted (cured) with polyisocyanates such as, for example, any polyfunctional compound of the general formula $R(NCX)_{n+1}$ which may be aliphatic, cycloaliphatic or aromatic, wherein n is any integer, X is oxygen or sulfur and R is a polyvalent organic radical. Examples of isocyanates are polymethylene diisocyanates, such as ethylene diisocyanate, trimethylene diisocyanate, tetramethylene diisocyanate, pentamethylene diisocyanate; cycloalkylene diisocyanates, such as cyclopentylene-1,3-diisocyanate, and cyclohexylene-1,4-diisocyanate; aromatic diisocyanates, such as metaphenylene diisocyanate, paraphenylene diisocyanate, 1-methyl-2,4-phenylene diisocyanate, naphthylene-1,4-diisocyanate, diphenylene-4,4'-diisocyanate or p-phenylene diisocyanates, for example, a tolylene diisocyanate or isomeric mixtures thereof are especially preferred.

Other suitable curing agents include the epoxides, such as, for example, those organic materials which have more than one vic-epoxy group, i.e., more than one

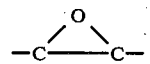

group, which group may be in a terminal position, i.e., a

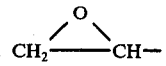

group or in an internal position, i.e., a

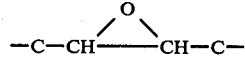

group. The polyepoxides may be saturated or unsaturated, aliphatic, cycloaliphatic, aromatic or heterocyclic and may be substituted with substituents, such as chlorine, hydroxyl groups, ether radicals, and the like.

Examples of such polyepoxides, include, among others, 1,4-bis(2,3-epoxypropoxy)benzene, 1,3-bis(2,3-epoxypropoxy)benzene, 4,4'-bis(2,3-epoxypropoxy)-diphenyl ether, 1,8-bis(2,3-epoxypropoxy)octane, 1,4-bis(2,3-epoxypropoxy)-cyclohexane, 4,4'-bis(2-hydroxy-3,4-epoxybutoxy)diphenyl dimethylmethane, 1,3-bis(4,5-epoxypentoxy)-5-chlorobenzene, 1,4-bis(3,4-epoxybutoxy)-2-chlorocyclohexane, 1,3-bis(2-hydroxy-3,4-epoxybutoxy)benzene, 1,4-bis(2-hydroxy-4,5-epoxypentoxy)benzene.

Other examples include the epoxy polyethers of polyhydric phenols obtained by reacting a polyhydric phenol with a halogen-containing epoxide or dihalohydrin in the presence of an alkaline medium. Polyhydric phenols that can be used for this purpose include, among others, resorcinol, catechol, hydroquinone, methyl resorcinol, or polynuclear phenols, such as 2,3-bis(4-hydroxphenyl)propane (Bisphenol A), 2,2-bis(4-hydroxyphenyl) butane, 4,4'-dihydrobenzophenone, bis(4-hydroxyphenyl)ethane, 2,2-bis(4hydroxyphenyl)-pentane and 1,5-dihydroxynaphthalene.

Other curing agents that are suitable under certain circumstances are the anhydrides, such as maleic anhydride, succinic anhydride and phthalic anhydride and the polyacyl halides such as oxalyl chloride and succinyl chloride.

In general, in forming a binder for a solid propellant, the $NF_2$ adduct and curing agent are mixed with the solid oxidizing agent(s) and packed or cast under vacuum in an appropriate rocket motor with a removable center core. Curing is then caused by heating at say 60° C for, say several hours to several days. Catalysts such as dibutyltin diacetate and $BF_3$-etherate may be employed when isocyanate and epoxide curing agents are used, respectively.

It is desirable to use an amount of binder that when said binder is reacted with the other components, will give adequate physical properties along with the highest impulse possible. In general, this is approximately 25% by weight of binder, but may be as little as about 10%.

It may also be desirable to include secondary energetic plasticizers in combination with plasticizers, such as dioctyl phthalate, and the like.

To illustrate the manner in which the invention may be carried out, the following examples are given. It is to be understood, however, that the examples are for the purpose of illustration and the invention is not to be regarded as limited to any of the specific compounds or conditions recited therein. Unless otherwise indicated, parts disclosed in the examples are parts by weight.

EXAMPLE I

This example illustrates the batch preparation of the instant poly(cyanodifluoroamino ethers), referred to herein as PCDE.

A polyether having the general formula

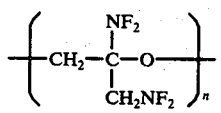

and a molecular weight of 3690 was prepared in a continuous process similar to that described for the difluoroamino-containing polyether in Example IV.

Five grams of this $NF_2$-containing polyether (33% solution in ether) were treated with 5 grams of pyridine (molecular sieved-dried), about a 20% excess of pyridine over the amount calculated to remove 50% of the fluorine from the $NF_2$-containing polyether. The reaction mixture was stirred at $<25°$ C for 2 hours and allowed to stand overnight. Some solid separated out. The mixture was diluted with $H_2O$, forming two phases. The organic phase was washed with dilute HCl and distilled water and dried over $MgSO_4$. The yield of PCDE in ether solution was 3.2gms, and had the following analysis:

| Molecular weight | 3000 |
|---|---|
| Carbon | 32.8% wt |
| Hydrogen | 2.7% wt |
| Nitrogen | 20.0% wt |
| Fluorine | 26.8% wt |
| F/N ratio | 0.99 |
| Fluorine loss, % | 44.3 |
| OH, eq/100g | 0.063 |
| OH functionality | 1.9 |
| Thermal Stability (cc/g/100 hours after 240 hours at 80° C) | 0.13 |

EXAMPLE II

The procedures of Example I were essentially repeated wherein a stoichiometrical amount of pyridine was used. The yield of PCDE was 3.29g from 5.0 grams of the $NF_2$-containing polyether.

EXAMPLE III

The procedures of Example I were essentially repeated wherein 30 grams of the $NF_2$-containing polyether in methylene dichloride (~25% solution) were treated with 30 grams of pyridine (20% stoichiometrical excess). 19.9 grams of PCDE were obtained having the following analysis:

| Molecular weight | 2910 |
|---|---|
| Carbon | 20.8% w |
| Hydrogen | 2.9% w |
| Nitrogen | 20.7% w |
| Fluorine | 26.2% w |

| -continued | |
|---|---|
| F/N | 0.94 |
| Fluorine loss, % | 46.0 |
| OH, eq/100g | 0.061 |
| OH functionality | 1.8 |
| Thermal Stability (cc/g/100 hr after 216 hr at 80° C) | 0.29 |

The above-prepared PCDE was then formulated into a non-energetic filled system as follows:

| | % wt |
|---|---|
| PCDE | 27.99 |
| Dibutyl phthalate | 22.39 |
| Dibutyltin diacetate | 0.50 |
| Glycerol (2 phr) | 0.56 |
| Tolylene diisocyanate (TDI) | 3.25 |
| $(NH_4)_2SO_4$ | 45.33 |

The mixture was cured at 50° C to produce a well-cured sample having the following properties:

| Tensile (max) psi | 41.1 |
|---|---|
| Elongation, % | 47.5 |
| Shore A | 47 |

EXAMPLE IV

This example illustrates the preparation of the present novel poly(cyanodifluoroamino ethers) (PCDE) utilizing a continuous process.

Preparation of Dehydrochlorinated Polyepichlorohydrin

A polyepichlorohydrin-methylene dichloride solution was first prepared by adding epichlorohydrin to a slurry of a previously prepared $BF_3$-glycerol catalyst-initiator complex in methylene dichloride (MDC) at 40° C using a 40:1 mole ratio of epichlorohydrin to glycerol. The residual $BF_3$ was then neutralized with aqueous ammonia.

A sample of the neat resin, which was a very viscous amber liquid, recovered by evaporating of the MDC had the following analysis:

| Molecular weight (No. ave.) | 2430 ± 120 |
|---|---|
| Methanol insoluble fraction | 31% wt |
| Hydroxyl | 0.079 eq/100g |
| Acidity | 0.001 eq/100g |
| $H_2O$ | 0.22% wt |

The dehydrochlorinated polyepichlorohydrin (DEPECH) was then prepared by the batch dehydrochlorination of the above-prepared PECH in tetrahydrofuran solution, using sodium methoxide as the dehydrochlorinating agent as follows:

A 60%w solution (139 lbs) of polyepichlorohydrin (PECH) in methylene dichloride (MDC) obtained in the first step of the synthesis, was drawn through a 1 sq. ft. horizontal wiped film evaporator held at 120° C under 20 inches vacuum. This yielded 83 lbs of the solvent-free resin, which was then redissolved in 83 lbs of tetrahydrofuran (THF).

A 300 gal. glass lined autoclave was then charged with 77 lbs of sodium methoxide powder, 222 lbs of THF and 17 lbs of dimethyl sulfoxide (DMSO). This mixture was stirred and heated to 65° C and held at this temperature during the addition of the PECH-THF solution over a 2 hour period. After another 4 hours at 65° C, the reaction mixture was cooled to 25° C and stirred, as 168 gallons of water were added at the rate of 6 gals per minute.

The product slurry was then passed through a 14 inch diameter basket centrifuge and the wet filter cake was re-slurried three times at 25° C with 100 gals of water each time. Hydroquinone (200 gms) was added to the final water wash. The washed DEPECH (91 lbs wet weight) was then partially dried in a 10 cubic foot tumble drier for 22 hours at 40°–50° C under 27 inches vacuum. Final removal of the water was carried out in a tray drier, held at 40° C under 30 inches vacuum for 27 hours. A net yield of 42.5 lbs of DEPECH was recovered, having the following analyses Unsat. = 1.45 moles/100g
hydroxyl = 0.116 eq/100g
molecular wt = 2010
acidity = 0.001 eq/100g
chlorine = 0.62 gms/100g
water = 0.15 gms/100g.

PREPARATION OF DIFLUOROAMINO-CONTAINING POLYETHER

A 11% solution of the above-prepared DEPECH (dehydrochlorinated polyepichlorohydrin) in acetone was fed to a reactor at 18 cc/minute together with 3.2 g/minute of $N_2F_4$ at 400 psig. The reactants were mixed with a mechanical stirrer and then passed through a coil at 65° for 15 minutes and a coil at 110° C for 45 minutes. The unreacted $N_2F_4$ was then stripped and recovered (ca. 50% excess). The resulting difluoroamino polyether had the following properties:

Nitrogen: 15.9%wt
Fluorine: 40.4%wt
F/N: 1.88
OH: 0.048 eq/100g
Molecular weight: 4380.

PREPARATION OF PCDE

A 11% solution of the above prepared difluoroamino polyether in acetone is contacted with a 10.3% solution of trimethylamine in acetone and passed through a coil reactor at 20° C at 5 minutes residence time.

The resulting reaction mixture was then diluted with methylene chloride (ca. 1:2 volume ratio based on reaction mixture) and contacted in a pump with 0.1N HCl (3:1 volume ratio). The resulting mixture was allowed to settle. The lower organic phase containing the polymer was passed through a packed (½-in Berl saddles) countercurrent water washing column approximately 3 inches × 4½'. The effluent from the bottom of the column contained methylene chloride, acetone, PCDE and water.

The water was removed from the mixture by passing the bottoms effluent through a column containing 4-A Linde molecular sieves (other drying agents are also suitable) to obtain a methylene chloride/acetone solution of the PCDE.

The solvent was removed in a Rinco evaporator at 50° C for 2 hours at 0.5 mm vacuum.

The resulting polymer was a tawny solid having the following properties:

| | |
|---|---|
| Nitrogen | 19.6% wt |
| Fluorine | 25.6% wt |
| F/N ratio | 0.96 (theory 1.0) |
| OH | 0.061 eq/100g |
| Mol. wt. | 2950 |
| Thermal Stability | 5.5 cc/g/100 hrs at 110° C |

It is important to note that the thermal stability of the PCDE was 5.5 cc/g/100 hours at 110° C whereas the thermal stability of the difluoroamino polyether precursor of comparable molecular weight is 104.0.

In this continuous process, the feed rates were as follows:

| | |
|---|---|
| Difluoroamino polyether/acetone | 52.4 cc/min |
| Trimethylamine/acetone | 22.6 cc/min |
| Methylene dichloride | 32 cc/min |
| HCl solution | 300 cc/min |
| Yield of PCDE | 0.5 lb/hr |

The above prepared PCDE was then formulated into a standard filled, non-energetic, cure formulation as follows:

| Component | Amount | wt % |
|---|---|---|
| PCDE | 5.56 grams | 27.93 |
| Dibutyl Phthalate | 4.44 grams | 22.34 |
| Dibutyltin diacetate | 80 microliters | 0.50 |
| Glycerol (2 phr) | 88.88 microliters | 0.56 |
| Tolylene diisocyanate (TDI) | 0.54 cc | 3.42 |
| $(NH_4)_2SO_4$ | 9 grams | 45.42 |

The above information was cured 16 hours at 50° C in "dog bone" molds, and subsequently tested on an Instron testing machine. The tensile strength was 65.2 psi and the elongation was 37.5%.

EXAMPLE V

The PCDE prepared according to Example IV was formulated into a standard, filled, non-energetic cure formulation as described in Example IV wherein 3 phr glycering (parts per 100 parts by weight of PCDE) were employed. The resulting tensile strength was 85.4 psi and the elongation was 31.1%.

EXAMPLE VI

The procedures of Example IV were essentially repeated wherein the following organic bases were employed in lieu of trimethylamine: pyridine, aniline and triethylamine.

Related results were obtained although longer residence times and/or higher reaction temperatures are required for pyridine and aniline. Trimethylamine was found to be the best organic amine used in the continuous process. If a batch or semi-batch process were employed, the other "slower" bases would be more acceptable.

We claim as our invention:
1. A polymer containing high energy groups and improved thermal stability which comprises a polyether having repeating units of

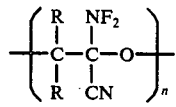

wherein each R is a lower alkyl radial or hydrogen and $n$ is an integer between 10 and 60.

2. A polymer as in claim 1 wherein the R's are hydrogen.

3. A process for preparing high energy polymeric materials having improved thermal stability which comprises reacting a polyether having the general formula

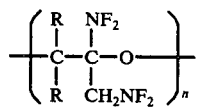

wherein each R is an alkyl radical or hydrogen and $n$ is an integer between 10 and 60 with an organic base having a $K_b$ of less than $1 \times 10^{-3}$.

4. A process as in claim 3 wherein the R's are hydrogen.

5. A process as in claim 3 wherein the organic base has a $K_b$ of from about $1.0 \times 10^{-4}$ to $1.0 \times 10^{-9}$.

6. A process as in claim 3 wherein the organic base is trimethylamine.

7. A process as in claim 3 wherein the organic base is triethylamine.

8. A process as in claim 3 wherein the organic base is anhydrous ammonia.

9. A process as in claim 3 wherein the reaction is performed in the presence of an organic solvent.

10. A process as in claim 9 wherein the organic solvent is acetone.

11. A process as in claim 3 wherein the organic base is employed in at least a stoichiometric amount to remove about 50% of the fluorine.

12. A cured polymer having high energy groups and improved thermal stability which is suitable as a solid propellant binder which comprises the reaction product of the polymer of claim 1 with an organic polyisocyanate.

13. A cured polymer as in claim 12 wherein the organic polyisocyanate is tolylene diisocyanate.

* * * * *